United States Patent Office.

ARTHUR VON GERSHEIM, OF SACHSENHOF-KÄRNTHEN, NEAR FEISTRITZ, AUSTRIA-HUNGARY.

COMPOSITION FOR ARTIFICIAL STONE, &c.

SPECIFICATION forming part of Letters Patent No. 363,864, dated May 31, 1887.

Application filed November 6, 1886. Serial No. 218,330. (No specimens.) Patented in Austria-Hungary December 15, 1880, No. 38,615 and No. 34,588.

*To all whom it may concern:*

Be it known that I, ARTHUR VON GERSHEIM, of Sachsenhof-Kärnthen, near Feistritz, Austria-Hungary, a subject of Wilhelm I, Emperor of Germany, &c., have invented a new and useful composition of matter to be used in the production of an artificial-stone mass for artificial ornaments, for architectural and building purposes, for paving, flagging, fencing, and for all purposes to which natural stone may be applied, and also for the production of grindstones and millstones and for cementing purposes, (for which I have obtained Letters Patent from the government of Austria and of Hungary, No. 38,615, and No. 34,588, both bearing the same date of December 15, 1880,) of which said invention the following is a full and exact specification.

My composition consists of a combination of clay or silicate of magnesia, together with a solution of chloride of magnesium and boracic acid or barium chloride with magnesium chloride.

The especial advantages of this composition and its superiority over other cements, and especially over other magnesia cements, consist in its extraordinary cementing power and its lasting qualities, whereby artificially-cast masses made from this composition are enabled to endure great wear and pressure without disintegrating, so that even grindstones and millstones of any desired quality and of extremely great durability may be made of it; also, that any desired color resembling natural stone or marble may be communicated to the mass and retain the same durability, and that the hardening of objects cast from this mass may be accelerated at discretion and carried to any desired degree.

Another important advantage lies in the removal of all the injurious sulphate salts in the chloride of magnesium, which are formed in the usual manner of preparing all magnesia cements and artificial-stone masses by the addition to chloride of magnesium prepared, in the usual manner, of barium chloride, or to a quite pure solution of chloride of magnesium an addition of boracic acid.

The preparation of my improved composition is performed as follows: Magnesite, which occurs abundantly in nature, is calcined at a red heat until all of its carbonic acid is driven off. It is then ground together with from thirty per cent. to fifty per cent. of its weight of pure clay or kaolin, and mixed with water and kneaded into a stiff mass, like dough, which is then, by means of any suitable press, formed into thin cylinders or tiles. The tiles so obtained are dried, and then calcined at a red heat until silica or clay is free, and after being sufficiently calcined are ground into a fine powder, and the resulting magnesia clay is preserved until used in air-tight and moisture-proof receptacles.

A solution is prepared of pure chloride of magnesium of 24° to 32° Baumé mixed with one per cent. of boracic acid, or chloride of magnesium with chloride of barium, and with this the magnesia clay is mixed into a pasty mass, which may be used in that state as a cement, and forms a most powerful and adhesive cement; but for casts and artificial masses there should be added to it sand or pieces of stone in proportions varying from one-half to twenty or more times its weight, according to the article to be produced, as will be hereinafter further specified, and of such color as may be desired in the finished objects to be cast. The composition so prepared may then be cast, in the usual manner, in molds, of wood, gypsum, or metal, with slight pressure, and when removed from their molds the objects cast harden at ordinary temperatures, or at 15° to 20° Celsius, in from three to forty-eight hours, according to the percentage of clay and the temperature employed.

The proportions and ingredients which I have found best for various purposes for which my composition is adapted, among others, are as follows, it being understood that a slight variation of the proportions given may be permitted without materially affecting the result, although the proportions specified are by me deemed most preferable for the respective purposes.

For art-casts, architectural ornaments, building-stone, and similar objects: Six parts, by weight, of magnesia clay; six parts, by weight, of magnesium chloride solution; twelve parts, by weight, of fine sharp clean sand.

For marble, statuary, floor-tiles, and similar objects: Ten parts, by weight, of magnesia clay; eight to ten parts, by weight, magnesium-chloride solution; thirty to forty parts, by weight, of marble sand.

For whetstones and grinding-stones: Fifty parts, by weight, of magnesia clay; forty-five parts, by weight, of magnesium chloride and boracic acid; seventy-five to one hundred and fifty parts, by weight, of emery or quartz powder.

For millstones: Three hundred parts, by weight, of magnesia clay; two hundred and fifty parts, by weight, of magnesium-chloride solution; three thousand parts, by weight, of pulverized quartz, flint, or feldspar.

I am aware that some of the above ingredients have before been used in the production of so-called "artificial stone and castings," but am not aware and do not believe that all of the above ingredients by me described have ever been used for that purpose or in proportions substantially similar to that above described by me for any of the above-named purposes.

Having fully described my invention, what I claim, and desire to secure by Letters Patent, is—

A composition of matter consisting of magnesia clay, chloride of magnesium, chloride of barium, or, as an equivalent of the latter, boracic acid, water, and sand or its described equivalents, in the proportions and for the purposes set forth.

ARTHUR V. GERSHEIM.

Witnesses:
EDMUND JUSSEN,
OTTO SCHEFFER.